United States Patent
Horabin et al.

(10) Patent No.: US 9,316,520 B2
(45) Date of Patent: Apr. 19, 2016

(54) METHODS OF MONITORING HYDRAULIC FLUID LEVELS IN AN AIRCRAFT

(71) Applicant: GE Aviation Systems Limited, Cheltenham (GB)

(72) Inventors: Robert William Horabin, Southampton (GB); Julia Ann Howard, Lee-On-The-Solent (GB); Daniel James Heath, Southampton (GB)

(73) Assignee: GE AVIATION SYSTEMS LIMITED, Cheltenham (GB)

( * ) Notice: Subject to any disclaimer, the term of this patent is extended or adjusted under 35 U.S.C. 154(b) by 241 days.

(21) Appl. No.: 14/152,258

(22) Filed: Jan. 10, 2014

(65) Prior Publication Data

US 2014/0224007 A1    Aug. 14, 2014

(30) Foreign Application Priority Data

Feb. 12, 2013  (GB) .................................. 1302426.0

(51) Int. Cl.
*G01F 23/00* (2006.01)

(52) U.S. Cl.
CPC ............ *G01F 23/00* (2013.01); *G01F 23/0076* (2013.01)

(58) Field of Classification Search
None
See application file for complete search history.

(56) References Cited

U.S. PATENT DOCUMENTS

| | | | | |
|---|---|---|---|---|
| 4,273,303 A * | 6/1981 | Somm | ..................... | B64C 25/60 188/266.2 |
| 4,286,464 A * | 9/1981 | Tauber | ................ | G01F 23/2924 340/619 |
| 4,704,865 A * | 11/1987 | Archung | ................. | B64C 13/42 244/226 |
| 5,331,850 A * | 7/1994 | Loos | ....................... | G01F 23/00 250/577 |
| 6,236,323 B1 * | 5/2001 | Fenny | ................. | G01F 23/0007 116/109 |
| 2010/0251816 A1 * | 10/2010 | Bahorich | .............. | G01F 23/268 73/304 C |
| 2011/0088383 A1 * | 4/2011 | Morvan | ................ | F15B 20/005 60/403 |
| 2015/0101403 A1 * | 4/2015 | Shepherd | ................ | G01F 22/00 73/149 |
| 2015/0260563 A1 * | 9/2015 | Venter | ..................... | G01F 23/26 73/304 C |

FOREIGN PATENT DOCUMENTS

| | | | | |
|---|---|---|---|---|
| EP | 0265761 A2 | | 5/1988 | |
| EP | 2141364 A2 * | | 1/2010 | ................ F15B 1/26 |

OTHER PUBLICATIONS

Search Report for counterpart GB13024260, Jul. 16, 2013.

* cited by examiner

*Primary Examiner* — Andre Allen
(74) *Attorney, Agent, or Firm* — GE Global Patent Operation; William S. Munnerlyn

(57) ABSTRACT

A method of monitoring hydraulic fluid levels in an aircraft includes identifying segments of operation where the aircraft meets a predetermined stability criteria, receiving output from the fluid sensor, calculating hydraulic fluid levels within the at least one hydraulic storage tank, determining a hydraulic fluid value indicative of the amount of hydraulic fluid in the aircraft based on at least the calculated hydraulic fluid level, and providing an indication of the hydraulic fluid value.

19 Claims, 3 Drawing Sheets

METHODS OF MONITORING HYDRAULIC FLUID LEVELS IN AN AIRCRAFT

CROSS-REFERENCE TO RELATED APPLICATIONS

This application claims priority under 35 U.S.C. §119 to British Patent Application No. 13024260, filed Feb. 12, 2013, the disclosure of which is incorporated herein by reference in its entirety.

BACKGROUND OF THE INVENTION

Contemporary aircraft may include a hydraulic system for operating or actuating movable components in the aircraft such as landing gear, brakes, etc. It is possible that the aircraft hydraulic system may lose fluid over time, or transfer fluid between points of storage so as to overfill a tank. Further, leaks, including spillages from overfills, may cause delays due to unscheduled maintenance. This may cause further operational impacts, which may cause a loss of revenue to airlines. It is currently difficult to take a truly representative reading of hydraulic fluid level during operation of the aircraft, especially when the aircraft is moving, including taxi, takeoff, landing, and flight of the aircraft, because the movement of the aircraft alters the level of the hydraulic fluid in the tanks where the fluid is stored.

BRIEF DESCRIPTION OF THE INVENTION

In one embodiment, the invention relates to a method of monitoring hydraulic fluid levels and includes identifying segments of operation where the aircraft meets a predetermined stability criteria while the aircraft is in operation, receiving output from a fluid sensor during the identified segments of operation to define a stable output, calculating hydraulic fluid levels based on the stable output, determining a hydraulic fluid value indicative of the amount of hydraulic fluid in the aircraft based on at least the calculated hydraulic fluid level, providing an indication of the hydraulic fluid value.

DESCRIPTION OF EMBODIMENTS OF THE INVENTION

As a result of frequent use of hydraulically driven systems on the runway and changing pitch, roll, yaw, and accelerations in the air, it is difficult to isolate a truly representative value of fluid levels in the hydraulic storage tanks 22. Readings are regularly taken during all points of flight but a large portion of these readings are unreliable for the above reasons. Embodiments of the invention account for such unreliable data and allow for more accurate monitoring of the hydraulic fluid levels.

Figure 1:
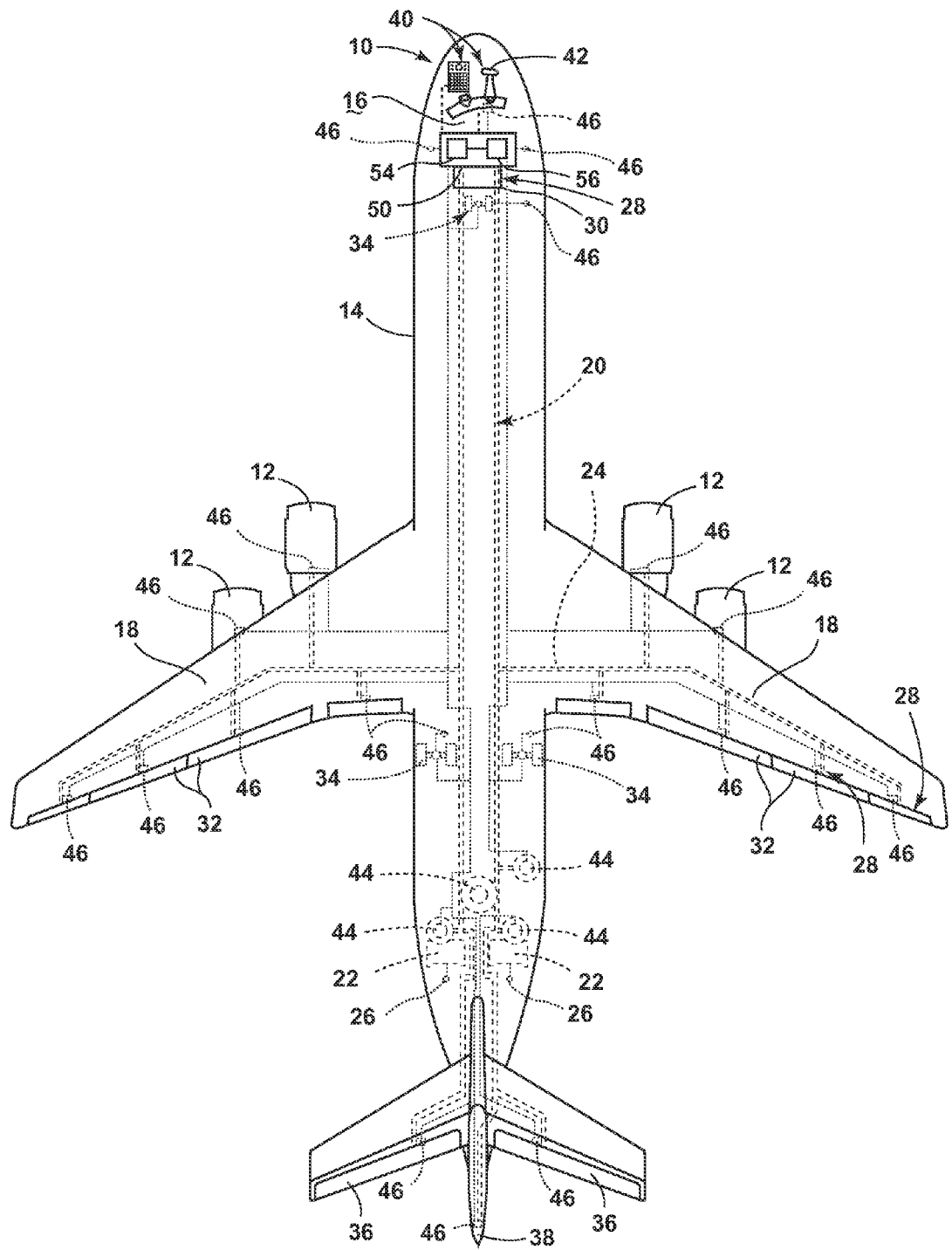
FIG. 1 is a schematic view of a portion of an aircraft having an exemplary hydraulic system.

FIG. 1 schematically depicts a portion of an aircraft 10 that may execute embodiments of the invention and may include one or more engine assemblies 12 coupled to a fuselage 14, a cockpit 16 positioned in the fuselage 14, and wing assemblies 18 extending outward from the fuselage 14. A hydraulic system 20 having a hydraulic storage tank 22 and a hydraulic circuit 24 and containing a desired amount of hydraulic fluid is included in the aircraft 10. In the illustrated example, two hydraulic storage tanks 22 have been illustrated and may be fluidly coupled to each other through the hydraulic circuit 24. A fluid sensor 26 may be operably coupled to each of the hydraulic storage tanks 22 and each may provide an output indicative of the amount of hydraulic fluid in the hydraulic storage tank 22.

The hydraulic circuit 24 may supply hydraulic fluid to hydraulic components 28 of the aircraft 10. Examples of hydraulic components 28 in the aircraft may include brakes 30, flaps 32 including multiple trailing edge flaps and multiple leading edge flaps, spoilers installed forward of the trailing edge flaps 32, landing gear 34, elevators 36, rudder 38, thrust reversers, etc. A variety of control mechanisms 40 may be included in the cockpit 16 for actuation or operating such hydraulic components 28. The control mechanisms 40 may be any suitable mechanisms. By way of non-limiting example, one control mechanism 40 may include a flap handle 42, which may be operated by a pilot to set the position of the multiple trailing edge flaps 32. The term flap handle as used in this description is not limited to a physical handle, rather it relates to the control device used to set the position of the flaps. Throughout the early part of aviation, this control device was a handle and the term flap handle has now become generic to the control device used to set the flap position, regardless of whether the control device is an actual handle or a button on a touch-screen user interface. One or more pumps 44 may be provided within the hydraulic circuit 24 to transfer hydraulic fluid to various portions of the aircraft 10 including the hydraulic components 28 and between the two hydraulic storage tanks 22 themselves.

A number of sensors 46 may also be included in the aircraft 10 and such sensors 46 may output any number of usable signals regarding the operation of the aircraft 10 and its various systems and components. For example, the sensors 46 may include a variety of sensors for determining the status of the hydraulic components including whether the hydraulic components are in use. Further, the sensors 46 may include a variety of sensors that determine various movements of the aircraft 10 including the pitch, roll, yaw, and acceleration of the aircraft 10.

Figure 2:
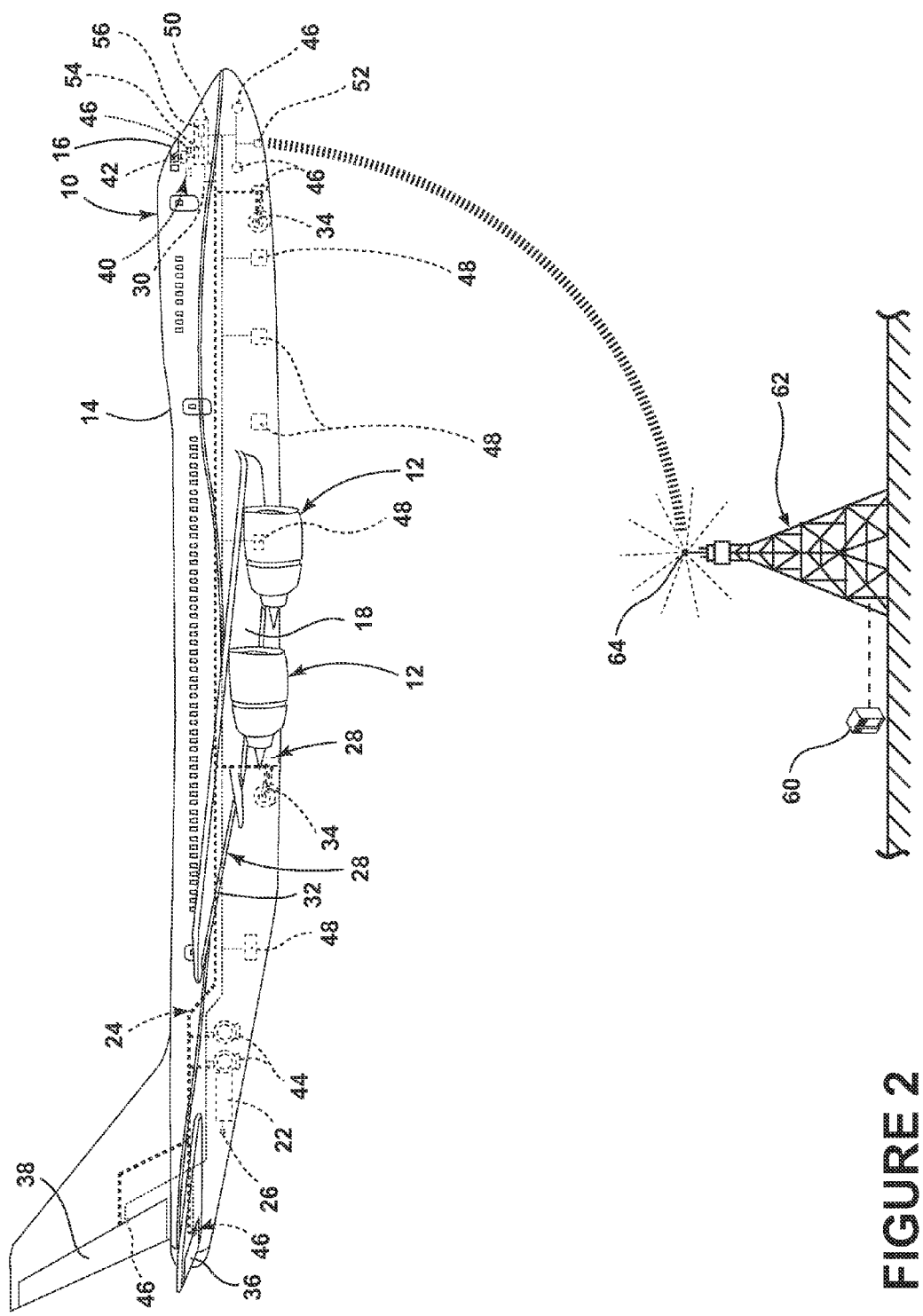
FIG. 2 is a perspective view of the aircraft of FIG. 1 and a ground station in which embodiments of the invention may be implemented.

Referring now to FIG. 2, it may more easily be seen that a plurality of additional aircraft systems 48 that enable proper operation of the aircraft 10 may also be included in the aircraft 10 as well as a controller 50, and a communication system having a wireless communication link 52. The controller 50 may be operably coupled to the plurality of aircraft systems 48 including the hydraulic system 20. For example, the hydraulic components 28, fluid sensors 26, control mechanisms 40, pumps 44, aircraft systems 48, and sensors 46 may be operably coupled to the controller 50.

The controller 50 may also be connected with other controllers of the aircraft 10. The controller 50 may include memory 54, the memory 54 may include random access memory (RAM), read-only memory (ROM), flash memory, or one or more different types of portable electronic memory, such as discs, DVDs, CD-ROMs, etc., or any suitable combination of these types of memory. The controller 50 may include one or more processors 56, which may be running any suitable programs. The controller 50 may be a portion of an FMS or may be operably coupled to the FMS.

A computer searchable database of information may be stored in the memory 54 and accessible by the processor 56. The processor 56 may run a set of executable instructions to access the database. Alternatively, the controller 50 may be operably coupled to a database of information. For example, such a database may be stored on an alternative computer or controller. It will be understood that the database may be any suitable database, including a single database having multiple sets of data, multiple discrete databases linked together, or even a simple table of data. It is contemplated that the database may incorporate a number of databases or that the database may actually be a number of separate databases. The database may store data that may include historical data related to the hydraulic system 20 for the aircraft 10 including previous hydraulic fluid levels the hydraulic system 20. The database may also include values for known hydraulic usage for in use hydraulic components 28 as well as stability criteria for the aircraft 10.

Alternatively, it is contemplated that the database may be separate from the controller 50 but may be in communication with the controller 50 such that it may be accessed by the controller 50. For example, it is contemplated that the database may be contained on a portable memory device and in such a case, the aircraft 10 may include a port for receiving the portable memory device and such a port would be in electronic communication with the controller 50 such that controller 50 may be able to read the contents of the portable memory device. It is also contemplated that the database may be updated through the wireless communication link 52. Further, it is contemplated that such a database may be located off the aircraft 10 at a location such as airline operation center, flight operations department control, or another location. The controller 50 may be operably coupled to a wireless network over which the database information may be provided to the controller 50.

While a commercial aircraft has been illustrated, it is contemplated that portions of the embodiments of the invention may be implemented anywhere including in a computer 60 at a ground system 62. Furthermore, database(s) as described above may also be located in a destination server or a computer 60, which may be located at and include the designated ground system 62. Alternatively, the database may be located at an alternative ground location. The ground system 62 may communicate with other devices including the controller 50 and databases located remote from the computer 60 via a wireless communication link 64. The ground system 62 may be any type of communicating ground system 62 such as an airline control or flight operations department.

One of the controller 50 and the computer 60 may include all or a portion of a computer program having an executable instruction set for monitoring hydraulic fluid levels in the hydraulic system 20. Regardless of whether the controller 50 or the computer 60 runs the program for monitoring the hydraulic fluid levels, the program may include a computer program product that may include machine-readable media for carrying or having machine-executable instructions or data structures stored thereon. Such machine-readable media may be any available media, which can be accessed by a general purpose or special purpose computer or other machine with a processor. Generally, such a computer program may include routines, programs, objects, components, data structures, algorithms, etc. that have the technical effect of performing particular tasks or implement particular abstract data types. Machine-executable instructions, associated data structures, and programs represent examples of program code for executing the exchange of information as disclosed herein. Machine-executable instructions may include, for example, instructions and data, which cause a general purpose computer, special purpose computer, or special purpose processing machine to perform a certain function or group of functions.

It will be understood that the aircraft 10 and the computer 60 merely represent two exemplary embodiments that may be configured to implement embodiments or portions of embodiments of the invention. During operation, either the aircraft 10 and/or the computer 60 may monitor fluid levels in the hydraulic system 20. Among other things, the controller 50 and/or the computer 60 may analyze the data output by the fluid sensors 26 to monitor fluid levels in the hydraulic system 20. For example, the fluid sensor 26 may output a signal of a level of fluid in the hydraulic storage tanks 22. Because the fluid moves within the aircraft 10 it will be understood that movement of the aircraft 10 may affect the signal output by the fluid sensors 26 even though the level of fluid in the hydraulic storage tanks 22 remains the same.

While the aircraft 10 is being operated the variety of control mechanisms 40 may be utilized to set the position of the hydraulic components 28. As certain systems are actuated, fluid is pumped from the hydraulic storage systems 22 to the hydraulic components 28. This usage alters the level of fluid in the hydraulic storage tanks 22. For example, the flap handle 42 may be used to control the position of the trailing edge flaps 32, which will cause fluid to be pumped to the trailing edge flaps 32. The controller 50 and/or the computer 60 may monitor the effect of the level in the hydraulic storage tanks 22 by the different systems. Alternatively, some hydraulic components 28 use a highly predictable amount of hydraulic fluid, such as the trailing edge flaps 32. The controller 50 and/or the computer 60 may utilize inputs from the control mechanisms 40, the fluid sensors 26, the sensors 46, the database(s) and/or information from airline control or flight operations department to monitor the hydraulic fluid levels in the aircraft 10.

It has been determined that by receiving output during stable portions of flight that more accurate fluid levels may be calculated. Such levels may not be completely accurate as some of the fluid is being used to fly the aircraft 10. However, known values of in use hydraulic fluid levels may be considered in making a more accurate determination. Based on such determinations it may be detected and/or predicted when these levels are too low, too high, or falling at an unacceptable rate. Once the amount of hydraulic fluid has been determined an indication may be provided on the aircraft 10 and/or at the ground system 62. It is contemplated that such determinations may be done during flight, may be done post flight, or may be done at the end of the day after any number of flights or after any number of days after any number of flights. The wireless communication link 52 and the wireless communication link 64 may both be utilized to transmit data such that the monitoring may be done by either the controller 50 and/or the computer 60.

Figure 3:
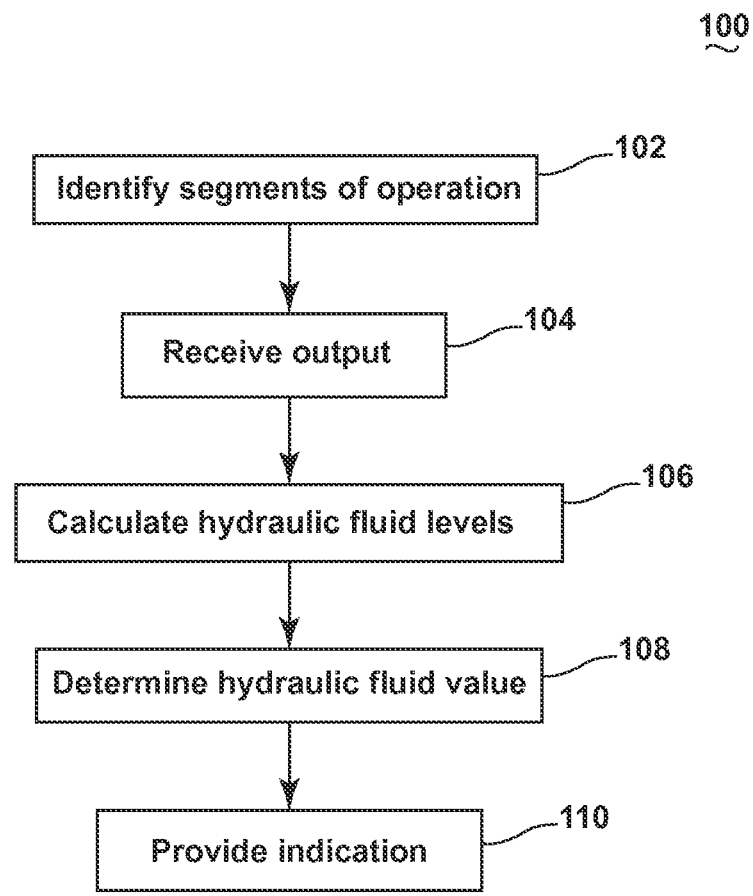
FIG. 3 is a flowchart showing a method of monitoring hydraulic fluid levels in an aircraft according to an embodiment of the invention.

In accordance with an embodiment of the invention, FIG. 3 illustrates a method 100, which may be used for monitoring hydraulic fluid levels in the hydraulic system 20 while the aircraft 10 is in operation. The method 100 begins at 102 by identifying segments of operation where the aircraft 10 meets predetermined stability criteria while the aircraft 10 is in operation. The stability criteria may be typically where the aircraft 10 is at near-zero pitch, roll, and acceleration. The stability criteria may also include the deployment or non-deployment of a variety of hydraulic components 28 and thus may include at least one of a suitable spoiler condition, a suitable flap handle position, a suitable thrust reverser position, and a suitable landing gear position. For example, Table 1 shows a variety of parameters and predetermined stability criteria that may be used for identifying segments of operation at 102.

TABLE 1

Exemplary Stability Criteria

| Parameter | Stability Criteria |
|---|---|
| Lateral acceleration | within 0.01 g of flight's modal value |
| Vertical acceleration | within 0.02 g of flight's modal value |
| Spoilers 4 and 9 | between −2 and +2 degrees |
| Flap handle position (case 1) | between −2 and 10 degrees |
| Flap handle position (case 2) | between 35 and 45 degrees |
| Heading | changing less than 3 degrees per half second |
| Roll | within 1 degree of flight's modal value |
| Thrust reversers | not deployed |
| Thrust reversers | not in transit |
| Left and right landing gears | deployed whilst on ground retracted for in cruise phase calculations |

In the table above the lateral acceleration and vertical acceleration have stability criteria that is related to acceleration due to gravity. Readings from the sensors 46 and information from the aircraft systems 48 such as binary values output by the aircraft systems 48 may be analyzed to determine whether the segment of flight meet such stability criteria. Thus, determining whether the segment of flight meets the stability criteria may include determining a position of the aircraft and movement of the aircraft and determining a position of the at least one movable component of the aircraft and comparing such information to the related stability criteria. Once it is determined what segment of flight meets the stability criteria, sets of readings at which fluid levels should be stable can be isolated. It is contemplated that the identified segments of operation may include multiple phases of flight of the aircraft 10. For example, the multiple phases of flight may include taxi, both before takeoff and after landing, and cruise.

At 104, output from the fluid sensors 26 may be received during the segments of operation identified at 102 to define a stable output. At 106, hydraulic fluid levels within the hydraulic storage tanks may be calculated based on the stable output received at 104. The hydraulic fluid levels in the hydraulic storage tanks 22 may be calculated in a variety of ways. The controller 50 and/or the computer 60 may, for example, calculate the hydraulic fluid levels as an amount of fluid based on the signal from the fluid sensors 26. Alternatively, the controller 50 and/or the computer 60 may access a look-up table of hydraulic fluid levels stored in one of the databases and may use the received output from the fluid sensor 26 to look-up the hydraulic fluid levels within each of the hydraulic storage tanks 22.

Further, the calculation of the hydraulic fluid levels may include adjusting the calculated hydraulic fluid levels for at least some of the hydraulic fluid in use as the aircraft 10 is in operation. For example, any regions when only these predictable hydraulic components 28 are being used can be corrected to increase the number of readings where there is a stable output. For example, adjusting the calculated hydraulic fluid levels may include adding at least some of the in-use hydraulic fluid to the calculated hydraulic fluid levels. The addition may be limited to adding known hydraulic fluid used by predictable hydraulic-using components.

At 108, a hydraulic fluid value indicative of the amount of hydraulic fluid in the aircraft 10 may be determined based on at least the hydraulic fluid level calculated at 106. For example, the controller 50 and/or the computer 60 may, for example, determine the hydraulic fluid value as a function of a percent of the size or capacity of the hydraulic storage tanks 22. In this manner, the hydraulic fluid value may be 90% for one of the hydraulic storage tanks 22. Alternatively, hydraulic fluid values may include determining at least one of a mean, median, mode, and standard deviation for the determined hydraulic fluid levels within the two hydraulic storage tanks 22. It is also contemplated that determining the hydraulic fluid value may include determining that the hydraulic fluid value is one of a low value or overfill value.

At 110, an indication of the hydraulic fluid value may be provided. Either, the controller 50 and/or the computer 60 may provide an indication of the hydraulic fluid value. It is contemplated that the indication may be a single indication for the hydraulic system 20 or that the indication may be provided separately for each of the hydraulic storage tanks 22. The indication may be provided in any suitable manner at any suitable location including in the cockpit 16 and at the ground station 62. For example, if the controller 50 ran the program, then the suitable indication may be provided on the aircraft 10 and/or may be uploaded to the ground system 62. Alternatively, if the computer 60 ran the program, then the indication may be uploaded or otherwise relayed to the aircraft 10. Alternatively, the indication may be relayed such that it may be provided at another location such as such as an airline control or flight operations department. Any number of indications may be provided depending on what hydraulic fluid value has been determined. For example, a low value or overfill value as well as the amount of fluid that should be added or removed may be indicated. For example, providing the indication at 110 may include indicating that hydraulic fluid should be emptied when the comparison indicates the determined hydraulic value is greater than the predetermined threshold. Conversely, the indication at 110 may include indicating that hydraulic fluid should be added when the comparison indicates the determined hydraulic value is less than the predetermined threshold. If either tank is between 105% and 112% full, a low severity overfill alert may be provided. If either tank is above 112%, a high severity overfill alert may be provided. If either tank is between 80 and 75% full, a low severity refill required alert may be provided. If either tank is below 75% full, a high severity refill required alert may be provided.

In implementation, the determinations, values, and any comparisons may be converted to an algorithm to monitor the fluid levels and output an indication thereof. Such an algorithm may be converted to a computer program comprising a set of executable instructions, which may be executed by the controller 50 and/or the computer 60.

It will be understood that the method of monitoring hydraulic fluid levels is flexible and the method illustrated is merely for illustrative purposes. For example, the sequence of steps depicted is for illustrative purposes only, and is not meant to limit the method 100 in any way as it is understood that the steps may proceed in a different logical order or additional or intervening steps may be included without detracting from embodiments of the invention. By way of non-limiting example, the method may include determining one of an overfill condition, a refill required condition, and a leak condition from the determined hydraulic fluid values and the indication provided may be related to the determined condition.

Further, the method may include comparing the determined hydraulic fluid value to historical values. This may include comparing one of the mean, median, mode, and standard deviation hydraulic fluid values to historical fluid values. A leak in the hydraulic system 20 may be determined therefrom and an indication of the leak may be provided. More specifically, embodiments of the method may include predicting various conditions including leaks based on analysis of the hydraulic fluid level information. Embodiments of the invention may also detect leaks through trend analysis. For example, the controller 50 and/or the computer 60 may find a five-flight oil change (i.e. a difference between current oil level and what it was five flights ago). If the difference is a decrease that is greater than one percent such information may be adjusted further.

First, anomalous changes may be ruled out according to a set of rules. For example, the set of rules may include that if another hydraulic storage tank 22 has increased hydraulic fluid levels, then the increase should be subtracted from the decrease. This accounts for an exchange of oil between tanks as what looks like a leak in one hydraulic storage tank 22 may simply be an exchange between any number of hydraulic storage tanks 22. The set of rules may include that if the time difference between any two flights in the five-point trend is greater than 12 hours and it is uncertain whether all flight data is recorded in the databases, large decreases may be disregarded. The set of rules may include that if another hydraulic storage tank 22 is greater than some high value, such as, 110%, then disregard high negative change as hydraulic storage tank 22 stops recording accurately at such amounts and the decrease is probably being transferred to the another hydraulic storage tank 22 without the increase being recorded. The set of rules may include that if the hydraulic storage tank 22 was greater than 105% five flights ago then a high negative change may be disregarded, as it is likely that an overfill was detected and oil was manually removed from the hydraulic storage tank 22, rather than it being indicative of any other condition. The set of rules may include that if the standard deviation of points used in recorded oil average is greater than five percent for any flights, then disregard large five-flight decreases for those flights, as the confidence in such readings is low. The set of rules may include that if readings are unavailable due to lack of viable points for two or more flights in a row or three flights overall in the five-flight oil change, changes are disregarded. The set of rules may include that if any flight within the five-flight range had an increase from its previous flight of more than three percent, then the change is disregarded.

Other adjustments may include that the five-flight oil changes starting at 30 flights previous to the current one may be summed up to get an accumulated change. This may also be done according to a set of rules. The set of rules may include that if more than one single-flight oil level changes are positive within the five flights used to calculate the current five-flight oil change, then the summation is reset to zero and continue. The set of rules may include that if the summation runs into a flight whose five-flight change was disregarded for one of the earlier reasons, reset the summed value to zero and continue the summation. In the event that any of the average values taken are not recorded, typically because there were no valid points according to the above restrictions on when points can be used, then interpolate through them to allow continuation of the summation towards the current flight.

For the summed changes, both median and modal propagated summations may be used in conjunction. An accumulated decrease in either tank of more than 20% in either modal or median values with the remaining modal or median value being at least above 14% combined with at least six valid accumulated points with median and modal losses of more than 5% each within the last 20 flights predicts a high severity leak fault. An accumulated decrease in either tank of more than 35% in both median and modal values without at least six points with median and modal losses of more than 5% each within the last 20 flights predicts a medium severity leak fault. An accumulated decrease in either tank of more than 20% in either modal or median values with the remaining modal or median value being at least above 14% without at least six valid accumulated points with median and modal losses of more than 5% each within the last 20 flights predicts a low severity leak fault. For example, Table 2 shows a variety of like indication criteria that may be used in predicting leaks.

TABLE 2

Leak Indication Criteria

| Accumulated modal decrease | Accumulated median decrease | >5 points with accumulated modal losses of >5% within last 20 flights? | >5 points with accumulated median losses of >5% within last 20 flights? | Indication given |
|---|---|---|---|---|
| >20% | >14% | Yes | Yes | High severity leak |
| >14% | >20% | Yes | Yes | High severity leak |
| >35% | >35% | No | No | Medium severity leak |
| 20% < decrease < 35% | >14% < decrease < 35% | No | No | Low severity leak |
| >14% < decrease < 35% | 20% < decrease < 35% | No | No | Low severity leak |
| >20% | <14% | Yes | Yes | None |
| <14% | >20% | Yes | Yes | None |
| >14% | <14% | Yes | Yes | None |
| <14% | >14% | Yes | Yes | None |
| >20% | <14% | No | No | None |
| <14% | >20% | No | No | None |
| >14% | <14% | No | No | None |
| <14% | >14% | No | No | None |

Thus, by comparing with earlier flights' readings, it may be detected whether more fluid than usual is being used and leaks may be identified.

Technical effects of the above described embodiments include that data gathered by the aircraft during flight may be utilized to monitor hydraulic fluid levels in an aircraft hydraulic system while it is in operation and provide an indication regarding the hydraulic fluid levels or hydraulic fluid values. A benefit of the above embodiments is that stable readings may be taken and analyzed. Further, by alerting on low or high levels before an operationally critical level is reached, time is allowed to plan for altering the levels without causing a delay. Embodiments of the invention may detect a leak, which will similarly allow for better operational planning, reducing the concern of lost revenue. Further, the current system of entering information by hand is prone to human error and automating the process of recording these will give a more accurate history of a given aircraft, which will be useful in future maintenance. Further, the embodiments of the invention have a predictive capacity that allows for maintenance planning before such conditions occur. This allows for cost savings by reducing maintenance cost, rescheduling cost, and minimizing operational impacts including minimizing the time aircraft are grounded.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of monitoring hydraulic fluid levels in an aircraft hydraulic system having at least one hydraulic storage tank supplying hydraulic fluid to at least one component of the aircraft, with a fluid sensor providing an output indicative of an amount of hydraulic fluid in the storage tank, the method comprising:
   identifying segments of operation where the aircraft meets predetermined stability criteria while the aircraft is in operation;
   receiving output from the fluid sensor during the identified segments of operation to define a stable output;
   calculating hydraulic fluid levels within the at least one hydraulic storage tank based on the stable output;
   determining a hydraulic fluid value indicative of the amount of hydraulic fluid in the aircraft based on at least the calculated hydraulic fluid level; and
   providing an indication of the hydraulic fluid value.

2. The method of claim 1 wherein the identified segments of operation include multiple phases of flight of the aircraft.

3. The method of claim 2 wherein the multiple phases of flight include taxi and cruise.

4. The method of claim 1 wherein the calculating the hydraulic fluid levels comprises adjusting the calculated hydraulic fluid levels for at least some of the hydraulic fluid in use as the aircraft is in operation.

5. The method of claim 4 wherein the adjusting the calculated hydraulic fluid levels comprises adding at least some in-use hydraulic fluid to the calculated hydraulic fluid levels.

6. The method of claim 5 wherein the adding comprises adding known hydraulic fluid used by predictable hydraulic-using components.

7. The method of claim 6 wherein the predictable hydraulic-using components comprise trailing edge flaps.

8. The method of claim 1, further comprising comparing the determined hydraulic value to a predetermined threshold.

9. The method of claim 8 wherein the providing the indication comprises indicating that hydraulic fluid should be emptied when the comparison indicates the determined hydraulic value is greater than the predetermined threshold.

10. The method of claim 8 wherein the providing the indication comprises indicating that hydraulic fluid should be added when the comparison indicates the determined hydraulic value is less than the predetermined threshold.

11. The method of claim 1, further comprising comparing the determined hydraulic fluid value to historical values.

12. The method of claim 11, further comprising determining a leak within the hydraulic system based on the comparison.

13. The method of claim 12 wherein the providing the indication comprises indicating the leak.

14. The method of claim 1 wherein the stability criteria includes at least one of a lateral acceleration within 0.01 g of flight's modal value, a vertical acceleration within 0.02 g of flight's modal value, a heading changing less than 3 degrees per half second, and a roll within 1 degree of flight's modal value.

15. The method of claim 1 wherein the stability criteria includes parameters including at least one of a suitable spoiler condition, a suitable flap handle position, a suitable thrust reverser position, and a suitable landing gear position.

16. A method of monitoring hydraulic fluid levels in an aircraft hydraulic system having two hydraulic storage tanks supplying hydraulic fluid to at least one movable component of the aircraft, with a fluid sensor operably coupled to each of the hydraulic storage tanks and providing an output indicative of an amount of hydraulic fluid in its related storage tank, the method comprising:
   determining a position of the aircraft and movement of the aircraft;
   determining a position of the at least one movable component of the aircraft;
   identifying segments of operation where the aircraft meets predetermined stability criteria while the aircraft is in operation;
   receiving output from the fluid sensors during the identified segments of operation to define a stable output;
   calculating hydraulic fluid levels within the hydraulic storage tanks based on the stable output;
   determining hydraulic fluid values indicative of the amount of hydraulic fluid in each of the hydraulic storage tanks based on at least the calculated hydraulic fluid levels;
   determining one of an overfill condition, a refill required condition, and a leak condition from the determined hydraulic fluid values; and
   providing an indication related to the determined condition.

17. The method of claim 16 wherein the calculating the hydraulic fluid levels comprises adjusting the calculated hydraulic fluid levels for at least some of the hydraulic fluid in use based on the received output regarding the position of the at least one movable component of the aircraft.

18. The method of claim 16 wherein the determining the hydraulic fluid values includes determining at least one of a mean, median, mode, and standard deviation for the calculated hydraulic fluid levels within the two hydraulic storage tanks.

19. The method of claim 18 wherein the determining the condition includes comparing the determined the at least one of the mean, median, mode, and standard deviation hydraulic fluid levels to historical fluid levels.

* * * * *

UNITED STATES PATENT AND TRADEMARK OFFICE
CERTIFICATE OF CORRECTION

PATENT NO. : 9,316,520 B2
APPLICATION NO. : 14/152258
DATED : April 19, 2016
INVENTOR(S) : Horabin et al.

It is certified that error appears in the above-identified patent and that said Letters Patent is hereby corrected as shown below:

Specification

In Column 1, Line 8, delete "13024260," and insert -- 1302426.0, --, therefor.

In Column 1, Line 56, delete "DESCRIPTION" and insert -- DETAILED DESCRIPTION --, therefor.

In Column 6, Line 21, delete "ground station 62." and insert -- ground system 62. --, therefor.

Signed and Sealed this
Twenty-third Day of August, 2016

Michelle K. Lee
*Director of the United States Patent and Trademark Office*